United States Patent Office 3,804,830

Patented Apr. 16, 1974

3,804,830

ALKYL 1,N-(SUBSTITUTED ALKYLENE)-2-BENZIMIDAZOLECARBAMATES

William Philip Langsdorf, Jr., Wilmington, Del., assignor to E. I. du Pont de Nemours and Company, Wilmington, Del.

No Drawing. Continuation-in-part of abandoned application Ser. No. 779,221, Nov. 26, 1968. This application May 5, 1971, Ser. No. 140,568

Int. Cl. C07d *51/18, 53/02*

U.S. Cl. 260—239.3 T 6 Claims

ABSTRACT OF THE DISCLOSURE

The novel compounds of the following structure are useful as fungicides and mite ovicides:

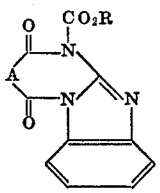

where R is methyl or ethyl, and A is a methylene, ethylene or vinylene group as set forth hereinafter.

An exemplary species of this class is methyl 2,3,4,5-tetrahydro-2,5-dioxo-1H - 1,3 - diazepino[1,2-a]benzimidazole-1-carboxylate.

CROSS REFERENCE TO RELATED APPLICATIONS

This application is a continuation-in-part of my copending application Ser. No. 779,221, filed Nov. 26, 1968 now abandoned.

BACKGROUND OF THE INVENTION

Various benzimidazolecarbamates have been found to have outstanding fungicidal activity. Examples of such compounds can be found in U.S. Pats. 2,933,502, 2,933,504 and 3,541,213.

This invention relates to a novel group of alkyl 1,N-(substituted alkylene)-2-benzimidazolecarbamates and to methods of using these compounds to prevent or mitigate damage to plants and inanimate organic material by fungi and mites. Fungus mycelia are killed or prevented from developing further by the presence of one or more of the compounds, i.e., the compounds are fungicidal or fungistatic.

SUMMARY OF THE INVENTION

It has been found that outstanding fungicidal and mite ovicidal activity can be obtained by applying to the locus of infection and/or infestation the compounds represented by the following formula:

Formula I

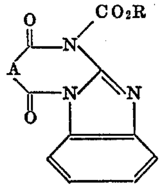

wherein

R is methyl or ethyl; and

A is methylene; methylene substituted with one or two substituents selected from methyl, chlorine, or bromine; ethylene; ethylene substituted with one or two substituents selected from methyl, chlorine, bromine or one methylene; vinylene; vinylene substituted with methyl, chlorine or bromine; or o-phenylene.

Preferred with Formula I because of the greater relative ease of preparation and higher biological activity are those compounds where R is methyl.

Most preferred are the following compounds:

methyl-2,3,4,5-tetrahydro-2,5-dioxo-1H-1,3-diazepino [1,2-a]benzimidazole-1-carboxylate;

methyl 5.13-dihydro-5,13-dioxo-6H-benzimidazo-[1,2-b][2,4]benzodiazepine-6-carboxylate; and methyl 1,2,3,4-tetrahydro-2,4-dioxopyrimido(1,2-α) benzimidazole-1-carboxylate.

DETAILED DESCRIPTION OF THE INVENTION

The compounds of this invention, which are represented by Formula I, can be prepared by the reaction of a dibasic acid dichloride (II) with an alkyl 2-benzimidazolecarbamate (III), as shown below:

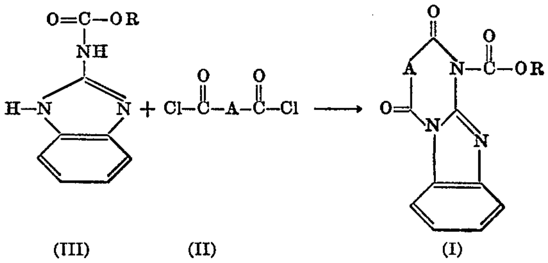

(III) (II) (I)

wherein:

R is methyl or ethyl; and

A is methylene; methylene substituted with one or two substituents selected from methyl, chlorine or bromine; ethylene; ethylene substituted with one or two substituents selected from methyl, chlorine, bromine or one methylene; vinylene; vinylene substituted with methyl, chlorine or bromine; or o-phenylene.

The reaction shown for the preparation of the compounds of Formula I is conducted preferentially in the presence of a suitable added acid acceptor, for example, sodium bicarbonate.

The following examples serve to illustrate the general method of preparation of the compounds of this invention. Unless otherwise stated, all parts are by weight.

EXAMPLE 1

Preparation of methyl 2,3,4,5 - tetrahydro - 2,5 - dioxo-1H - 1,3 - diazepino[1,2-a]benzimidazole - 1 - carboxylate To a stirred mixture of methyl 2 - benzimidazolecarbamate (143 parts) and sodium bicarbonate (64 parts) in chloroform (1,000 parts) is slowly added succinyl chloride (120 parts). The reaction temperature during addition is kept at 25–30° C. After the reaction mixture is stirred overnight at room temperature, water is added and the resulting two-phase system separated. The organic layer is washed with sodium bicarbonate solution, dried over anhydrous magnesium sulfate and the chloroform evaporated under vacuum. The resulting residue is the product, which can be crystallized from acetone to afford methyl 2,3,4,5 - tetrahydro - 2,5 - dioxo - 1H - 1,3 - diazepino [1,2-a]benzimidazole - 1 - carboxylate (43.1 parts) as a solid of M.P. 178–182° C.

*Analysis.*—Calcd. for $C_{13}H_{11}N_3O_4$ (percent): C, 57.14; H, 4.03; N, 15.39. Found (percent): C, 57.44; H, 3.86; N, 15.39.

EXAMPLE 2

Preparation of methyl 5,13 - dihydro - 5,13 - dioxo - 6H-benzimidazo[1,2 - b][2,4]benzodiazepine - 6 - carboxylate To a stirred mixture of methyl 2-benzimidazolecarbamate (142 parts) and sodium bicarbonate (64 parts) in chloroform (1,000 parts) is slowly added phthaloyl chloride (160 parts). The reaction mixture is stirred overnight at room temperature. Water is then added and the two layers separated. The chloroform layer is further washed with water and dried over anhydrous magnesium sulfate. The chloroform is evaporated under vacuum from the dried solution. The residue, a yellow solid, is the product, which can be crystallized from ethyl acetate to afford methyl 5,13 - dihydro - 5,13 - dioxo - 6H - benzimidazo [1,2-b][2,4]benzodiazepine - 6 - carboxylate (28.5 parts) as a solid of M.P. 166–167° C.

*Analysis.*—Calcd. for $C_{17}H_{11}N_3O_4$ (percent): C, 63.55; H, 3.42; N, 13.09. Found (percent): C, 63.51; H, 3.54; N, 12.85.

EXAMPLE 3

Other compounds which are prepared according to the general methods exemplified in Examples 1 and 2 include:

| Structure | |
|---|---|
| 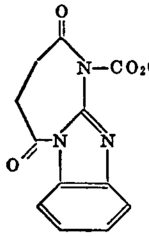 | Ethyl 2,3,4,5-tetrahydro-2,5-dioxo-1H-1,3-diazepino[1,2-a]benzimidazole-1-carboxylate. |
| 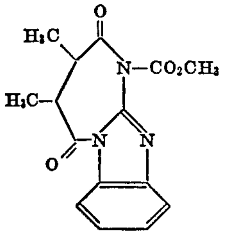 | Methyl 2,3,4,5-tetrahydro-3,4-dimethyl-2,5-dioxo-1H-1,3-diazepino[1,2-a]benzimidazole-1-carboxylate. |
| 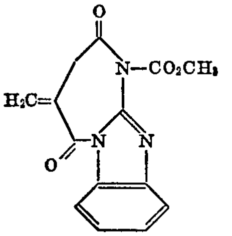 | Methyl 2,3,4,5-tetrahydro-4-methylene-2,5-dioxo-1H-1,3-diazepino[1,2-a]benzimidazole-1-carboxylate. |
| 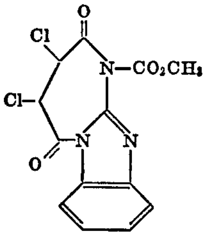 | Methyl 3,4-dichloro-2,3,4,5-tetrahydro-2,5-dioxo-1H-1,3-diazepino[1,2-a]-benzimidazole-1-carboxylate. |
| 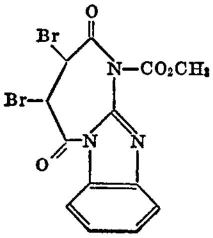 | Methyl 3,4-dibromo-2,3,4,5-tetrahydro-2,5-dioxo-1H-1,3-diazepino[1,2-a]benzimidazole-1-carboxylate. |

TABLE—Continued

| Structure | |
|---|---|
| 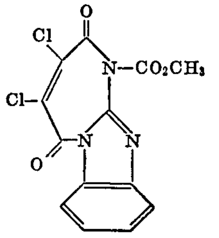 | Methyl 3,4-dichloro-2,5-dihydro-2,5-dioxo-1H-1,3-diazepino[1,2-a]benzimidazole-1-carboxylate. |
| 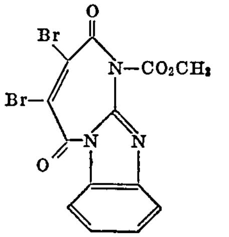 | Methyl 3,4-dibromo-2,5-dihydro-2,5-dioxo-1H-1,3-diazepino[1,2-a]benzimidazole-1-carboxylate. |
| 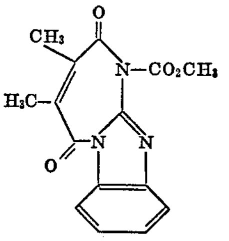 | Methyl 2,5-dihydro-3,4-dimethyl-2,5-doixo-1H-1,3-diazepino[1,2-a]benzimidazole-1-carboxylate. |
| 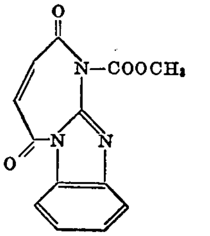 | Methyl 2,5-dihydro-2,5-dioxo-IH-1,3-diazepino[1,2-a]benzimidazole-1-carboxylate. |
| 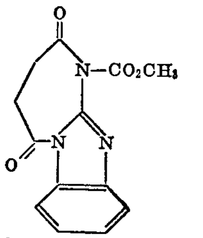 | Methyl 1,2,3,4-tetrahydro-2,4-dioxopyrimido[1,2-a]benzimidazole-1-carboxylate. |

EXAMPLE 4

Preparation of methyl 1,2,3,4 - tetrahydro - 3,3 - dimethyl-2,4 - dioxopyrimido(1,2 - α)benzimidazole - 1 - carboxylate To a stirred mixture of methyl 2-benzimidazolecarbamate (114 parts) and potassium carbonate (165 parts) in chloroform (1,000 parts) is slowly added dimethylmalonyl chloride (100 parts). The reaction is stirred for 72 hours at room temperature and then filtered. The filtrate is washed with water, 5% sodium bicarbonate, and dried over anhydrous magnesium sulfate. The chloroform is evaporated under vacuum from the dried solution. The residue solidifies and affords on recrystallization from cyclohexane, methyl 1,2,3,4 - tetrahydro - 3,3 - dimethyl-2,4 - dioxopyrimido(1,2-α)benzimidazole - 1 - carboxylate (63 parts), M.P. 164–166°.

As mentioned previously, it has been found that the compounds of Formula I possess outstanding fungicidal and mite ovicidal activity when employed to prevent or mitigate damage to plants and inanimate organic materials. A further aspect of this invention involves methods which when used in conjunction with the compounds of Formula I, result in advances in mite and fungus control of great practical importance. The paragraphs which follow describe in more detail the utility of this invention.

The compounds of the invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plant propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth.

The many fungi against which the compounds of this invention are active may be represented by, but is not intended to be limited to, the following: *Venturia inaequalis,* which causes apple scab; *Podosphaera leucotricha,* which causes powdery mildew on apple; *Uromyces phaseoli,* which causes bean rust; *Cercospora apii,* which causes early blight of celery; *Cercospora beticola,* which causes leaf spot of sugar beets; *Sclerotinia sclerotiorum,* which causes rot of vegetable crops, such as lettuce, beans, carrots, and celery; Colletotrichum spp., which cause anthracnose of fruits and vegetables, such as beans, tomatoes and coffee; *Septoria apii,* which causes late blight of celery; *Cercospora musae,* which causes Sigotoka disease of banana; Piricularia sp., which causes Johnson spot on banana; *Erysiphe cichloracearum,* which causes powdery mildex on cantaloupe and other cucurbit crops; *Penicillium digitatum,* Phomopsis spp., and *Diplodia natalensis,* which cause fruit rots on citrus; *Ceratostomella ulmi,* which causes Dutch elm disease; *Sphaerotheca humuli,* which causes powdery mildew on roses; *Diplocarpon rosae,* which causes black spot on roses; Ramularia sp., which causes leaf spots on ornamental plants; *Botrytis cinerea,* which causes blossom and fruit rots of ornamentals, fruits and vegetables; *Uncinula necator,* which causes powdery mildew on grapes; *Guignardia bidwellii,* which causes grape black rot; *Melonconium fuligineum,* which causes white rot of grapes; *Coccomyces hiemalis,* which causes cherry leaf spot; Cytospora sp., which cause cankers of trees; *Cladosporium carpophilum,* which causes peach scab; *Fusicladium effusum,* which causes pecan scab; *Erysiphe graminis,* which causes powdery mildew on cereals; *Monolinia* (*Sclerotinia*) *laxa* and *M. fructicola,* which cause brown rot of stone fruits, such as peaches, cherries and apricots; *Pseudopenziza ribes,* which causes leaf spot on gooseberry; *Piricularia oryzae,* which causes rice blast; *Puccinia glumarum* and *P. coronata* which cause leaf rusts of wheat, oats and grasses, respectively; *Puccinia graminis tritici,* which causes stem rust of wheat; *Claviceps purpurea,* which causes ergot of rye and grasses; *Aspergillus niger,* which causes cotton boll rot as well as decay following wounding in many plant tissues; *Aspergillus flavus,* which causes mold growth on peanuts, as well as on other food and field materials; *Aspergillus terreus,* which is common in soil and attacks vegetable matter; *Tilletia caries* and other Tilletia species, which cause common bunt of wheat; *Ustilago tritici, Ustilago nigra, Ustilago avena* (and other Ustilago species), which cause loose smut of wheat, barley, and oats, respectively; *Urocystis tritici* and other Urocystis species, which cause loose smut of wheat; *Sphacelotheca sorghi,* which causes covered smut of sorghum; *Ustilago hordei* and *Ustilago kolleri,* which cause covered smut of barley and oats, respectively; *Pithomyces chartorum,* which is present in turf, pastures, and other grassy areas and is known to have several secondary effects; *Gloeodes pomigena,* which causes sooty blotch on apples; *Physalospora obtusa,* which causes black rot on apples; *Microthyriella rubi,* which causes flyspeck on apples; various species of Rhizoctonia, Fusarium and Verticillium present in soil and attacking the roots or other underground parts and the vascular system of a variety of plants; various species of Penicillium growing on such things as fabric, fiber board, leather goods and paint; species of Myrothecium attacking such items as shower curtains, carpets, mats and clothing.

The mite ovicidal action of the compounds of this invention is useful in preventing the development of damaging populations of mites or in causing the gradual reduction of existing populations. The movement of mites is limited. Thus, an increase in population or the continuation of a high population in a particular locus depends largely upon the hatching of eggs laid in that locus.

Mite eggs do not hatch to produce living young if these eggs are treated with one of these compounds, or if they are laid on a surface containing one of these compounds. Further, the eggs will not hatch if they are laid by a female mite that has been in contact with one of these compounds, or are laid by a female mite that is ingesting or has recently ingested food such as plant juices containing one of these compounds. This interference with the hatching of eggs prevents the population from increasing significantly beyond that present at the time of treatment. Also, this ovidical action, along with the high natural mortality of adults, can largely eliminate mites from an already infested area over a relatively short period of time. Further as long as the compounds are present on the surface the mites occupy or remain in their food supply, new populations cannot develop.

Many species of mites which cause damage to fruits, field crops, vegetables, and ornamentals under a wide variety of circumstances, are controlled by the compounds and methods of this invention. The extent of the practical utility of the mite control obtained is represented by, but is not intended to be limited to, the following listing of specific susceptible mites along with the types of damage that they can cause; *Panonychus ulmi* (European red mite) and *Tetranychus telarius* (two-spotted mite) which are commonly called "orchard mites"; these mites attack a great many deciduous tree fruits including apples, pears, cherries, plums and peaches; *Tetranychus atlanticus* (Atlantic or strawberry mite), *T. cinnabarinus* (carmine spider mite) and *T. pacificus* (Pacific mite); these mites attack cotton and numerous other crop plants; *Paratetranychus citri* (citrus red mite) and others which attack citrus; *Bryobia praetiosa* (clover mite) which attacks clover, alfalfa and other crops; *Phyllocoptruta oleivora,* the citrus rust mite; *Aceria neocynodomis* which attacks grasses and other plants; *Tyrophagus lintneria* which is a serious pest in stored foods and on cultivated mushrooms and *Lepidoglyphus destructor* which injures Kentucky bluegrass seed in storage.

The compounds of this invention when applied by certain of the methods of this invention enter and move freely within plants, i.e., they are systemic. Thus both fungi and mites can be controlled in plants in parts well removed from the point of application. In view of this activity the compounds can be applied to seeds; thus the treatment of cucumber seeds with a few grams per 50 kilograms of seed of a compound of this invention provides control of powdery mildew (*Erysiphe cichoracearum*) and spider mites such as *Tetranychus urticae* on the resulting plants for periods in excess of 40 days. Applications to soil also provides control of certain foliage diseases and mites on plants growing in the treated soil. Spray or dust treatments of plant foliage and stems impart protection against both fungi and mites to other parts of the plant not actually sprayed and to new foliage developing later.

There are important practical advantages associated with the use of an effective systemic pesticide. Thus successful application to seed as described above, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also to tall plants, such as shade trees, where the spray will not reach to the top.

An additional valuable characteristic of the compounds of this invention is their ability to prevent the spread or to kill fungus infection already established within a plant, i.e. they are curative. Thus, the compounds need not be applied until after conditions develop which permit the actual initiation of fungus attack. This means that, under some circumstances, it is possible to avoid applying any chemical during the entire life of the crop. In other cases, only a part of the normal full schedule of pesticide is required.

Therefore great savings both in chemical cost and application labor are possible with compounds capable of systemic and curative performance. Another saving is afforded by the compounds of this invention through the fact that both fungi and mites are controlled by applications of a single chemical.

The compounds of this invention provide protection from damage caused by fungi, mites or both when applied to the proper locus by the methods described hereinafter and at a sufficient rate to exert the desired fungicidal and mite ovicidal effect. They are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweetpotatoes, tobacco, hops, turf and pasture.

Living plants may be protected from fungi and mites by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms. Applications are made from dusts, slurries or solutions. Such treatments protect the treated parts themselves from damage due to fungi, mites, or both, and in addition, impart extended protection against both types of pests to the resulting new plants.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or other liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foliage roots and the like, harvested for food or feed, are protected from decay and other deterioration caused by fungi or mites during processing, distribution and storage by treatment with an active compound of this invention. The plant parts to be so protected can be dipped in a liquid bath containing the active ingredient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

Wood, leather, fabric, fiber board, paper and other industrial materials of an organic nature can be protected from decomposition or discoloration by fungi and infestation by mites by coating, incorporating or impregnating with an effective amount of one or more of the compounds of this invention. The coating can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 and 95% by weight. More preferred rates are in the range of 0.05 to 50%, with the most preferred rates being in the range of 0.1 to 25%.

Where incorporation or impregnation procedures are to be employed, use rates may be expresed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are protected from rot, fungus stains and unsightly mold growth as well as infestation by mites by the active compounds of this invention. Again, either surface or deep protection can be obtained. Surface treatment is by dips, washes, sprays, aerosols or dust applications. Deep treatment is accomplished by penetrating solutions. Sprays, dips and washes contain the active compound of the invention at rates of 10 to 5000 parts per million. Fluids for aerosol application and dusts contain 0.1 to 20% by weight. Penetrating solvent solutions contain an amount of the active ingredient that results in a deposit of 5 to 20,000 parts per million in the material to be protected.

Damage by mites to stored organic products such as grain, seed, bulks, tubers, meat or animal hides is kept to a minimum by treating the floors, walls, portions, and other parts of warehouses or other structures with one or more of the active compounds. Applications are made by the use of dusts, sprays, or aerosols with preferred use rates in the range of 0.05 to 1000 grams of the active compound of this invention per 93 square meters of surface to be kept free of excessive mite populations.

As was previously set forth, the compounds of this invention are especially suited for use on living plants. Application to the foliage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the compounds of this invention, successful control of plant diseases can also be accomplished by applications made after they are present. Fungus mycelia within the plant tissue are actually killed. This approach or effect is termed "curvative" or "eradicant" and permits the user to realize considerable savings.

Curative control of plant diseases with the compounds of this invention is enhanced if the treated plant parts are moist for one or more periods of 2 to 12 hours each soon after the active compound is applied. Often the slow drying of an original spray treatment or naturally occurring rains, mists, fogs or dews will accomplish this. Under other circumstances, such as during dry periods or in shelters such as greenhouses, it is necesary to keep the plants moist by some special effort for best results.

When the compounds of this invention are applied, their activity can be enhanced by using certain adjuvants, for example in the water in which the benzimidazole fungicides are dispersed. These adjuvants may be surface active agents, oils, humectants, enzymes, carbohydrates, and organic acids. They improve the performance on tubers, on foliage, in treatments used for dip application to roots of living plants, in the case of liquids used for injection into the roots or stems of living plants, or in mixtures used to treat fruits, tubers, bulbs, roots, and the like, after harvest.

Surface active agents that enhance fungus control and mite control by the compounds of this invention include sulfonated and sulfated amines and amides, diphenyl sulfonate derivatives, ethoxylated alcohols, ethoxylated alkylphenols, ethoxyltaed fatty acids, ethoxylated fatty esters and oils, polyethylene oxide/polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated and sulfonated oils and fatty acids, alkylbenzene sulfonates, imidazolines, taurates, ethoxylated mercaptans, ethoxylated amines and amides, modified phthalic glycerol alkyd resins, and similar materials. The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycolic and gluconic acids. Although the precise manner in which these additives improve the performance of the fungicides of this invention is not known, the effect is, nevertheless, startling, and it is possible that these additives improve the penetration into the plant or translocation throughout the plant of the fungicides of this invention.

Preferred surface active agents to improve the fungicidal and mite ovicidal activity of these compounds are products such as dioctyl sodium sulfosuccinates ("Aerosol" OT and "Aerosol" OT–B), blends of aromatic sulfonates and ethylene oxide derivatives ("Argrimul" GM, "Agrimul" A–100, "Agrimul" N–100, "Emcol" H50A, "Emcol" H53), polyoxyethylene sorbitol oleate/laurate ("Atlox" 1054A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam" Base LL), oleic acid esters of sodium isethionate ("Igepon" AP78), sodium N-methyl-N-oleoyl taurate ("Igepon" T77), sodium salt of sulfated lauryl and myristyl colamide ("Intramine" Y), polyethylene glycol 400 oleic acid ester ("Nonisol" 210), sodium dodecylbenzene sulfonate ("Sul-Fon-Ate" AA 10, "Ultrawet" K), polyoxyethylene ethers with long-chain alcohols ("Surfonic" LR 30, "Alfonic" 1012–6, "Brij" 30, "Tergitol" TMN), ethylene oxide condensates with propylene oxide/ethylene diamine condensates ("Tetronic" 504), polyhydric alcohol esters ("Trem" 014), modified phthalic glycerol alkyl resins ("Triton" B 1956), quaternaries ("Zelec" DP), alkylphenol ethylene oxide condensate ("Dowfax" 9N4, "Dowfax" 9N10, "Hyonic" 9510, "Tergitols") and the like. Examples given in parentheses are illustrative and do not exclude other unnamed commercial products. Examples of other surface active agents in each of these several categories are listed in "Detergents and Emulsifiers," 1968 Annual, published by John W. McCutcheon, Inc., 236 Mount Kemble Ave., Morristown, N.J.

Preferred oils include spray oils such as "Orchex" 796 made emulsifiable with "Triton" X–45, castor oil made emulsifiable with "Triton" X–114, corn oil made emulsifiable with "Triton" X–114, Volck Oil #70, Sunoco Oil No. 7E and similar nonphytotoxic spray oils of vegetable, animal or mineral origin.

The preferred rates for these surfactants when used in sprays is in the range from 10 to 10,000 parts per million of the spray fluid. More preferred rates are in the range of 30 to 3,000 parts per million and the most preferred rates are in the range of 100 to 1,000 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

As previously mentioned, the compounds of the invention are systemic. For systemic applications to above-ground parts, such as foliage, stems and fruit, the presence of a surface-active agent in the spray or dust enhances activity. Use rates for the surface active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of both mites and fungi on plants is also accomplished by applications to seeds, tubers, bulbs or other reproductive parts prior to planting as well as by application of the chemical to the soil in which the plants to be protected are, or will be, growing. Application to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection through irrigation water or by distribution on the field surface.

Compositions of this invention are formulated by mixing a compound of this invention wtih an adjuvant, i.e., one or more surface active agents or one or more inert solid or liquid diluents and their mixtures. The adjuvant can also be the surfactants, oils, humectants, enzymes, organic acids, carbohydrates, etc. previously mentioned as agents acting to enhance the activity of the active compounds.

The surface active agents used in this invention can be wetting, dispersing or emulsifying agents. They may act as wetting agents for wettable powders and dusts, as dispersing agents for wettable powders and suspensions and as emulsifying agents for emulsifiable concentrates. Surfactants also enhance the biological activity of the compounds of this invention as previously mentioned. Such surface active agents can include such anionic, cationic, amphoteric, and nonionic agents as have heretofore been generally employed in plant control compositions of similar type. Suitable surface active agents are set out, for example, in "Detergents and Emulsifiers Annual—1968" by John W. McCutcheon, Inc. Other surface active agents not listed by McCutcheon but still effective dispersants by virtue of protective colloid action include methyl cellulose, polyvinyl alcohol, hydroxyethylcellulose, and alkyl substituted polyvinyl pyrrolidones.

Suitable surface active agents for use in compositions of this invention include polyethylene glycol esters with fatty and rosin acids, polyethylene glycol ethers with alkyl phenols or with long-chain aliphatic alcohols, polyethylene glycol ethers with sorbitan fatty acid esters, and polyoxyethylenethio ethers. Other suitable surfactants include amine, alkali and alkaline earth salts of alkylaryl sulfonic acids, amine, alkali and alkaline earth fatty alcohol sulfates, dialkyl esters of alkali metal sulfosuccinates, fatty acid esters of amine, alkali and alkaline earth isethionates and taurates, amine, alkali and alkaline earth salts of lignin sulfonic acids, methylated or hydroxyethylated cellulose, polyvinyl alcohols, alkyl substituted polyvinyl pyrrolidone, amine, alkali and alkaline earth salts of polymerized alkylnaphthalenesulfonic acids, and long-chain quaternary ammonium compounds. Anionic and nonionic surface active agents are preferred.

Among preferred wetting agents are sodium alkylnaphthalenesulfonates, sodium dioctylsulfosuccinate, sodium dodecylbenzenesulfonate, ethylene oxide condensates with alkylated phenols such as octyl-, nonyl- and dodecylphenol sodium lauryl sulfate, and trimethylnonyl polyethylene glycols. Among preferred dispersing agents are sodium, calcium and magnesium lignin sulfonates, low-viscosity methyl cellulose, low-viscosity polyvinyl alcohol, alkylated polyvinyl pyrrolidone, polymerized alkyl naphthalene sulfonates, sodium N-oleyl or N-lauryl isethionates, sodium N-methyl-N-palmitoyl taurate and dodecylphenol polyethylene glycol esters.

Among preferred emulsifying agents are ethylene oxide adducts of lauric, oleic, palmitic or stearic acid esters of sorbitan or sorbitol, polyethylene glycol esters with lauric, oleic, palmitic, stearic or rosin acids, oil-soluble alkylarylsulfonates, oil-soluble polyoxyethylene ethers with octyl-, and nonyl- and dodecyl-phenol, polyoxyethylene adducts to long-chain mercaptans, and mixtures of these surfactants.

Compositions of this invention will contain, in addition to surface active agents, solid or liquid diluents to produce wettable powders, dusts, granules or emulsifiable liquids as desired.

The pressures of an expanding world population, together with the need for more economical agricultural practices have resulted in earlier harvesting of grains, including corn. Frequently the grain is stored or sold to grain elevators without proper drying. Spoilage of the grain under these conditions may be quite rapid, with the formation of toxins and other substances that are very harmful or fatal when fed to animals.

Safe, effective feed additives that combat spoilage are thus of great importance to agriculture.

The compounds of this invention can be used to prevent the spoilage of animal feeds. In particular, when mixed with the feed, they provide more efficient and longer lasting protection without harm or injury to livestock that consume it. The compounds of this invention may be conveniently formulated for this use in a number of ways and these formulations may be mixed directly with mixed feed, newly harvested hay and newly harvested grain. These compounds effectively prevent the spoilage of corn, sorghum, wheat, barley, oats, rye and other grains that may be used as livestock feed.

Under normal conditions, these compounds may be incorporated into feeds at rates of from 0.01% to 0.25% with excellent results. Higher rates may be required under very damp conditions.

These compounds can also be used to improve the performance of other feed additives, such as sodium propionate, by mixing the two additives directly, or by adding them separately to the feed to be protected.

(A) Wettabie powders: Wettable powders are compositions which usually contain inert solid diluents in addition to surfactants. These inert diluents may serve several purposes. They can act as grinding aids to prevent mill smear and screen blinding, they can aid rapid dispersion of the mix when placed in water, they can adsorb liquid or low-melting solid active material to produce a free-flowing solid product, they can prevent agglomeration into lumps upon prolonged hot storage, and they can permit preparation of compositions with a controlled amount of active ingredient so that proper dosage is easily measured by the consumer.

Suitable diluents may be either inorganic or organic in origin. These include the natural clays, diatomaceous earth, synthetic mineral fillers derived from silica or silicates, insoluble salts produced by precipitation in fluffy form such as tricalcium phosphate or calcium carbonate, and powdered organic diluents such as shell flours, wood flours, corn cob flour or sucrose. Preferred fillers for the compositions of this invention include kaolin clays, attapulgite clay, nonswelling calcium magnesium montmorillonites, synthetic silicas, synthetic calcium and magnesium silicates, diatomaceous silica, corn cob flour and sucrose.

Wettable powders will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettable powders of this invention, when taken together, will comprise from about 0.5 weight percent to about 5.0 weight percent of the total composition. The active component will be present at a concentration of from about 25% to 80% and diluent makes up the balance to 100%. Where needed a corrosion inhibitor or foaming inhibitor may be added at rates of 0.1% to 1.0% with a corresponding reduction in diluent.

(B) Dusts: Dust compositions are those intended for application in dry form with suitable dusting equipment. Since wind drift is undesirable when applying dusts, the most suitable dust diluents are those which are dense and rapid settling. These include kaolinites, talcs, pyropyllites, ground phosphate rock. Serecite, and ground tobacco stems. However, dusts are usually most easily prepared by diluting an existing high-strength wettable powder with a diluent so that the final dust will frequently contain a fraction of light, absorptive diluent as well as a denser filler.

A wetting agent is often desirable in dust formulations so that adhesion to dew-covered foliage is enhanced. Dusts made from wettable powders will usually contain sufficient wetter, but dusts made directly from unformulated active will often contain an added wetting agent. Dry solid anion or nonionic wetters are preferred.

Dust formulations will normally contain from 5.0 weight percent to 25 weight percent of active material, from 0.005% to 1.0% wetting agent, and from 3% to 20% light grinding aid diluent and the balance dense, rapid settling diluents. If made by diluting a prepared wettable powder it will also contain a small amount of dispersing agent which has no active role when the composition is used as a dry dust.

(C) Emulsifiable liquids: Emulsifiable liquids are formulated by combining the compounds of this invention with a suitable emulsifier and an organic liquid with low water-solubility. The active component may be completely dissolved in the organic liquid or it may be a finely ground suspension in a nonsolvent liquid. Suitable organic liquids include alkylated naphthalenes, xylene, high molecular weight ketones, such as isophorone, dibutyl or diamyl ketone, esters such as amyl acetate and normal- or iso-paraffins. Most preferred emulsifiers are blends of oil soluble sulfonates and nonionic polyoxyethylene glycol esters or ethers of fatty acids, alkylated phenols, or sorbitan fatty acid esters.

The active component in emulsifiable concentrates will be present at from 10 weight percent to about 40 weight percent. Combined emulsifiers will be present at from 3 weight percent to about 10 weight percent and the balance will be an organic carrier liquid or solvent.

(D) Granules: Soil treatments with fungicides, either pre- or post-emergence can frequently be most readily applied with granules. Granular products, with the compounds of this invention, can be made in a number of ways. The active materials can be melted or dissolved in a volatile carrier and sprayed upon preformed granules. They may be mixed as powders with suitable diluents and binders, then moistened and granulated followed by drying. Powders may also be applied to coarsely porous granules by tumbling together and applying a binder, as for example nonvolatile liquid such as oil, glycol or a liquid non-ionic surfactant. Rates of granule disintegration and dispersion of active material in moist soil can be controlled by choice of added surfactants or selection of the binder used to form the granule.

Suitable preformed granules include those made from attapulgite clay, granular expanded vermiculite, ground corn cobs, ground nut shells or preformed kaolinite granules. When active fungicides is placed upon such carriers the concentration may range from 1% to 25%. However, unless applied from a molten state, it is difficult to prevent segregation of active and carrier in concentration ranges above about 10% on preformed granules. When higher concentrations of active are desired best results are obtained by premixing powdered active ingredient with diluents, binders and surfactants, then granulating so that the active is distributed throughout the granule and not solely upon its surface.

Suitable diluents for the preparation of granules by granulation or extrusion include sucrose, kaolin clays, nonswelling Ca, Mg montmorillonites, and gypsum. Cohesion to a firm granule is usually obtained by moistening, compacting and drying, with or without some binding agent. Kaolin clays form firm granules if bound together with gelatinous agents such as methylcellulose, natural gums or swelling bentonite. Ca, Mg bentonites require no binder and gypsum can be made to form firm granules with either the addition of plaster of Paris or certain salts such as ammonium sulfate, potassium sulfate or urea which form double salts with gypsum.

The active content of formed granules can range from 1–90% although 75% active represents about the upper level if controlled disintegration of the granule in moist soil is desired. Control of disintegration rate is attained by controlled compaction, e.g., controlled extrusion pressure and by the addition of inert water-soluble components such as sugar or sodium sulfate which can leach away.

The compositions of the invention can contain, in addition to the active ingredient of this invention, conventional insecticides, miticides, bactericides, nematocides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a,4,7,7a-tetrahydro-indane;
1,2,3,4,10,10-hexachloro-6,7-epoxy-1,4,4a-5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-exo-5,8-dimethanonaphthalene (endrin);
1 (or 3a),4,5,6,6,8,8-heptachloro-3a,4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl N-methylcarbamate (carbaryl);
methylcarbamic acid, ester with phenyl, 4-(dimethylamino)-3,5-dimethyl;
methylcarbamic acid, ester with 1,3-dithiolan-2-one oxime;
O,O-diethyl-O-(2-isopropyl-4-methylpyrimid-6-yl) thiophosphate;
O,O-dimethyl-1-hydroxy-2,2,2-trichloroethyl phosphonate (diazinon);
O,O-dimethyl-S-(1,2-dicarbethoxyethyl)dithiophosphate (malathion);
O,O-dimethyl-O-p-nitrophenyl thiophosphate (methyl parathion);
O,O-dimethyl-O-(3-chloro-4-nitrophenyl)thiophosphate;
O,O-diethyl-O-p-nitrophenyl thiophosphate (parathion);
di-2-cyclopentenyl-4-hydroxy-3-methyl-2-cyclopenten-1-one chrysanthemate;
O,O-dimethyl-O-(2,2-dichlorovinyl)phosphate (DDVP);
mixture containing 53.3% "Bulan," 26.7% "Prolan" and 20.0% related compounds;
O,O-dimethyl-O-(2,4,5-trichlorophenyl)phosphorothioate;
O,O-dimethyl-S-(4-oxo-1,2,3-benzotriazine-3(4H)-yl-methyl)phosphorodithioate (azinphosmethyl);
bis(dimethylamino)phosphonous anhydride;
O,O-diethyl-O-(2-keto-4-methyl-7-a'-pyranyl)thiophosphate;
O,O-diethyl (S-ethyl mercaptomethyl)dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl-O-(2-(ethylmercapto)-ethyl)thiophosphate;
2,4-dinitro-6-sec-butyl phenol;
toxaphene;
O-ethyl-O-p-nitrophenylbenzenethiophosphonate;

4-chlorophenyl 4-chlorobenzenesulfonate;
p-chlorophenyl phenyl sulfone;
tetraethyl pyrophosphate;
1,1-bis(p-chlorophenyl)ethanol;
1,1-bis(chlorophenyl)-2,2,2-trichloroethanol;
p-chlorophenyl p-chlorobenzyl sulfide;
bis(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum
monocarboxylic acids;
butoxypolypropylene glycol;

ethyl 2 - hydroxy-2,2-bis(4-chlorophenyl)acetate(chlorobenzilate);
p-dichlorobenzene;
2-butoxy-2′-thiocyanodiethyl ether;
naphthalene;
methyl O-carbamylthiolacetohydroxamate;
1,1-dichloro-2,2-bis(p-ethylphenyl)ethane;
methyl O-(methylcarbamoyl)thioacetohydroxamate (methomyl);
5-methyl 1-dimethylcarbonyl-N-[(methylcarbamoyl)oxy] thioformimidate;
p-dimethylaminobenzenediazo sodium sulfonate;
quinone oxyaminobenzooxohydrazone;
tetraalkyl thiuram disulfides such as tetramethyl thiuram disulfide or tetraethyl thiuram disulfide;
metal salts of ethylene bisdithiocarbamic acid, e.g. manganese, zinc, iron and sodium salts;
pentachloronitrobenzene;
N-dodecylguanidine acetate (dodine);
N-trichloromethylthiotetrahydrophthalimide (captan);
2,4-dichloro-6-(o-chloroaniline)-s-triazine ("Dyrene"®);
2-(o-hydroxyphenyl)-1,3-dithiolane methylcarbamate ester;
2-(o-hydroxyphenyl)-1,3-dioxolane methylcarbamate ester;
2,6-dichloro-4-nitroaniline;
3,3′-ethylenebis(tetrahydro-4,6-dimethyl-2H-1,3,5-thiodiazine-2-thione);
cupric hydroxide;
tribasic copper sulfate;
fixed copper;
1,4-dichloro-2,5-dimethoxy benzene;
metal (e.g. iron, sodium and zinc), ammonium and amine salts of dialkyldithiocarbamic acids;
tetrachloronitroanisole;
hexachlorobenzene;
hexachlorophene;
sulfur;
tetrachloroquinone;
2,3-dichloro-1,4-naphthoquinone;
1,2-dibromo-3-chloropropene;
1,2-dibromo-3-chloropropane;
dichloropropane-dichloropropene mixture;
ethylene dibromide;
chloropicrin;
sodium monomethyl dithiocarbamate (SMDC);
tetrachloroisophthalonitrile
streptomycin kasugamycin or other antibiotics;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The following examples illustrate the activity of the compounds of Formula I. All parts are parts by weight unless otherwise indicated.

EXAMPLE 5

| | Percent |
|---|---|
| Methyl 2,3,4,5 - tetrahydro - 2,5 - dioxo - 1H-1,3-diazepino[1,2-a]benzimidazole-1-carboxylate | 50 |
| Dioctyl sodium sulfosuccinate (85%) | 3 |
| Methyl cellulose 15 cps. | 0.5 |
| Sucrose | 46.5 |

The components are mixed and micropulverized, then air milled until the active material is substantially all below three microns.

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at 14-day intervals during the growing season with the above formulation, and the other four trees are left unsprayed.

By the end of the season the unsprayed trees have developed very high population of orchard mites and are highly infected with apple scab, *Venturia inaequalis.* Due to the feeding of the mites, the foliage is russeted and drops prematurely. Also, the untreated trees have poor twig growth and small, spotted fruit.

The trees sprayed with methyl 2,3,4,5-tetrahydro-2,5-dioxo - 1H - 1,3 - diazepino[1,2-a]benzimidazole - 1-carboxylate are essentially free of mites, their eggs and apple scab. As a result of the excellent mite control, the sprayed trees have foliage of a thrifty, dark green color, and they exhibit good twig growth and fruit size.

Any of the compounds named in Examples 1 through 4 e.g., methyl 1,2,3,4-tetrahydro-3,3-dimethyl-2,4-dioxopyrimido(1,2-a)benzimidazole - 1 - carboxylate, may be formulated as described in this example and when used as indicated give similar results.

EXAMPLE 6

| | Percent |
|---|---|
| Methyl 5,13 - dihydro - 5,13 - dioxo - 6H - benzimidazo[1,2-b][2,4]-benzodiazepine-6-carboxylate | 70 |
| Alkylnaphthalenesulfonic acid, sodium salt | 3 |
| N-methyl-N-palmitoyl taurate | 2 |
| Diatomaceous silica | 25 |

Components are blended, micropulverized and air milled in a fluid energy mill.

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus telarius*) are placed on a terminal leaf on each of the test plants. Twenty-four hours later these adult mites, all still alive, are removed in a way which causes no damage to the eggs that have been laid during the twenty-four hour period.

The number of eggs laid by each batch of 50 mites is essentially the same. A sufficient time is allowed for all viable eggs to hatch. Counts demonstrate that none of the eggs hatch from among those laid by mites that had fed on foliage from pots with soil containing the compound of this formulation. Hatch to provide living young was complete, on the other hand, among eggs laid by mites similarly handled except that the plants providing sustenance were not in contact with the compound of this formulation. This experiment demonstrates systemic movement in plants and mites ovicide effect.

EXAMPLE 7

| | Percent |
|---|---|
| Ethyl 5,13 - dihydro-5,13-dioxo - 6H - benzimidazo-[1,2-b][2,4]benzodiazepine-6-carboxylate | 50 |
| Sodium lauryl sulfate | 1 |
| Sodium lignin sulfonate | 4 |
| Corn cob flour (particle size less than 0.05 mm.) | 45 |

Components are mixed in a ribbon blender, micropulverized and micronized until the active material is nearly all less than 5 microns.

A uniform field planting of cantaloupe in North Carolina is inoculated with the powdery mildew fungus (*Erysiphe cichoracearum*). After 10 days this organism has become well established in the plants.

At this time alternate rows are sprayed with water containing a suspension of the wettable powder prepared as described above and an added amount of a polyhydric alcohol ester surface active agent ("Trem" 014). The concentration of this chemical suspension is such as to give 227 grams of the active compound of this formulation per 378 liters of water (0.06%) and 400 p.p.m. of the surfactant. The spray is applied at a volume of 1410 liters per hectare. The remaining rows are left unsprayed.

After another 15 days the unsprayed rows are heavily damaged by powdery mildew and some of the plants are dying. The sprayed rows, however, are healthy and growing rapidly. The results indicate that the active compound of the suspension acts as a curative fungicide.

EXAMPLE 8

| | Percent |
|---|---|
| Ethyl 2,3,4,5-tetrahydro-2,5-dioxo-1H - 1,3 - diazepino[1,2-a]benzimidazole-1-carboxylate | 50 |
| Alkylnaphthalenesulfonic acid, Na salt | 1.5 |
| Partially desulfonated sodium lignin sulfonate | 48.5 |

The dry components are blended, micropulverized, then air milled in a micronizer to a particle size of 5 microns, or less.

Test plots are established in a rice field. The plots are sprayed with water containing a suspension of the wettable powder described above along with a modified phthalic glycerol alkyd resin surface active agent (Triton B 1956). The amount of the wettable powder used is such as to provide 1.5 grams of the active compound of this invention per liter of water. The amount of "Triton" B 1956 is 400 p.p.m. in the final spray. The spray is applied at weekly intervals at the rate of 900 liters per hectare. The remainder of the field is left unsprayed. Three months after the start of the test, the sprayed plots are healthy and growing well. The untreated plots, on the other hand, are seriously damaged by the rice blast fungus, *Piricularia oryzae* which greatly reduces yield.

EXAMPLE 9

| | Percent |
|---|---|
| Formulation of Example 6 | 14.29 |
| Pyrophyllite | 85.71 |

The two powders are blended together in a ribbon blender to produce a 10% active dust.

The formulation of this example is useful for the control of peach scab and brown rot caused by the fungi. *Cladosporium carpophilum* and *Monilinia laxa*. This is demonstrated by an orchard study in which random trees in a peach planting are dusted. Starting in the spring selected trees are dusted from all sides with the formulation of this example from a knap sack hand-powdered dusting device at a rate of approximately 50 kilograms per hectare. The same trees are dusted each 14 days throughout the season. At harvest the trees receiving the dust treatment are heavily laden with large healthy peaches. On the other hand, the trees which did not receive the dust treatment had only a few fruit because of a severe blossom blight infection with brown rot, and those remaining fruit were severely spotted with scab lesions.

EXAMPLE 10

| | Percent |
|---|---|
| Methyl 5,13 - dihydro-5,13-dioxo-6H-benzimidazo-[1,2-b][2,4]benzodiazepine-6-carboxylate | 25 |
| Sodium lauryl sulfate | 0.5 |
| Corn cob flour (particle size less than 0.05 mm.) | 25.0 |
| Tobacco stem dust | 49.5 |

The active, wetting agent and cob flour are first blended, micropulverized and air milled, then blended with the tobacco stem dust.

A vineyard of grapes which has had serious disease problems in past years is selected as a test site. Alternate rows are dusted with the product of this formulation every 14 days from early spring until harvest. The dust is applied at a rate of approximately 10 kilograms per hectare. Care is taken to avoid excessive drift onto the adjacent rows which do not receive a treatment. At harvest the berries in the treated rows are large and firm and the clusters are well filled out and covered with luxuriant green foliage.

On the other hand, the berries in the untreated rows are small, cracked, open, and rotting because of infections by the fungus *Uncinula necator* which causes powdery mildew and the fungus *Botrytis cinerea* which rots the fruit. The vines of the untreated rows are also stunted and the leaves insufficient to cover the fruit because of powdery mildew infection.

EXAMPLE 11

| | Percent |
|---|---|
| Methyl 2,3,4,5-tetrahydro - 2,5 - dioxo-1H-1,3-diazepino[1,2-a]benzimidazole-1-carboxylate | 5 |
| Cane sugar | 5 |
| Expanded vermiculite (0.4–0.8 mm.) | 80 |
| Polyethylene glycol 400 di-tri ricinoleate | 10 |

The active and sugar are first blended, micropulverized and air milled. This powder is then blended briefly with the vermiculite followed by spraying while tumbling with the surface active agent to prevent segregation of active and vermiculite.

A single row is selected in a sugar beet field for treatment with the dust of this formulation. After the sugar beets are one month old and a few lesions of *Cercospora beticola* have become evident as spots on the leaves, weekly dust treatments are applied to the selected row. The 5% dust of this formulation is applied to a single row at approximately 30 kilograms per hectare. There is some drift to adjacent rows but the remainder of the field is left untreated. At harvest the foliage is examined and the beets are dug and weighed. The treated row is a vigorous healthy row with lush green foliage and the beets are large and normal. The adjacent rows are spotted with numerous leaf spot lesions, and the remainder of the field is almost entirely defoliated. A few young leaves on the untreated beets are still green but all of the older leaves are dried up. Beets from the untreated rows are less than half normal size.

EXAMPLE 12

| | Percent |
|---|---|
| Methyl 2,3,4,5-tetrahydro-3,4-dimethyl-2,5-dioxo-1H-1,3-diazepino[1,2-a]benzimidazole-1-carboxylate | 10 |
| Ca, Mg lignin sulfonate | 25 |
| Kaolin | 65 |

Equal parts of active and lignin sulfonate are first blended, micropulverized and air milled. This powder is then blended with the clay and balance of the lignin sulfonate. The blended product is moistened with water, granulated and dried, then screened to obtain 30–60 mesh granules having a particle size ranging from 0.25 mm. to 0.6 mm.

Alternate rose bushes growing in a greenhouse are dusted lightly at weekly intervals with the formulation described above. After two months of this program the treated plants are healthy, with dark green attractive foliage and are growing well. The untreated plants, on the other hand, have much foliage discolored and curled due to infection by the rose powdery mildew organism, *Sphaerotheca humuli.* Other foliage on the untreated plants is yellowed due to attack by the Atlantic mite (*Tetranychus atlanticus*). Due to the extensive foliage damage, the plants not treated with the compound of this invention grow more slowly than the protected plants.

I claim:

1. A compound of the formula

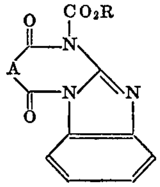

wherein

R is methl or ethyl; and

A is methylene; methylene substituted with one or two substituents selected from methyl, chlorine or bromine; ethylene; ethylene substituted with one or two substituents selected from methyl, chlorine, bromine or one methylene; vinylene; vinylene substituted with methyl, chlorine or bromine; or o-phenylene.

2. A compound of claim 1 wherein R is methyl.

3. The compound of claim 1 which is methyl 2,3,4,5-tetrahydro-2,5-dioxo-1H-1,3-diazepino[1,2 - α]benzimidazole-1-carboxylate.

4. The compound of claim 1 which is methyl 5,13-dihydro-5,13-dioxo - 6H - benzimidazo[1,2-β][2,4]benzodiazepine-6-carboxylate.

5. The compound of claim 1 which is methyl 1,2,3,4-tetrahydro-3,3-dimethyl-2,4-dioxopyrimido[1,2 - α]benzimidazole-1-carboxylate.

6. A process for making alkyl 1,N-(substituted alkylene)-2-benzimidazolecarbamates of the formula

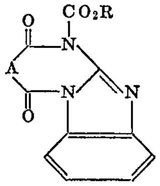

characterized in that a dibasic acid chloride of the formula

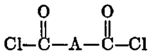

is reacted with an alkyl 2-benzimidazolecarbamate of the formula

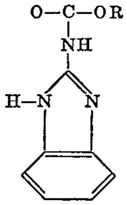

preferably in the presence of an acid acceptor, wherein

R is methyl or ethyl; and

A is methylene; methylene substituted with one or two substituents selected from methyl, chlorine or bromine; ethylene; ethylene substituted with one or two substituents selected from methyl, chlorine, bromine or one methylene; vinylene; vinylene substituted with methyl, chlorine or bromine; or o-phenylene.

No references cited.

HENRY R. JILES, Primary Examiner

R. T. BOND, Assistant Examiner

U.S. Cl. X.R.

260—239.3 P, 256.4 F; 424—273, 251